Patented Jan. 20, 1942

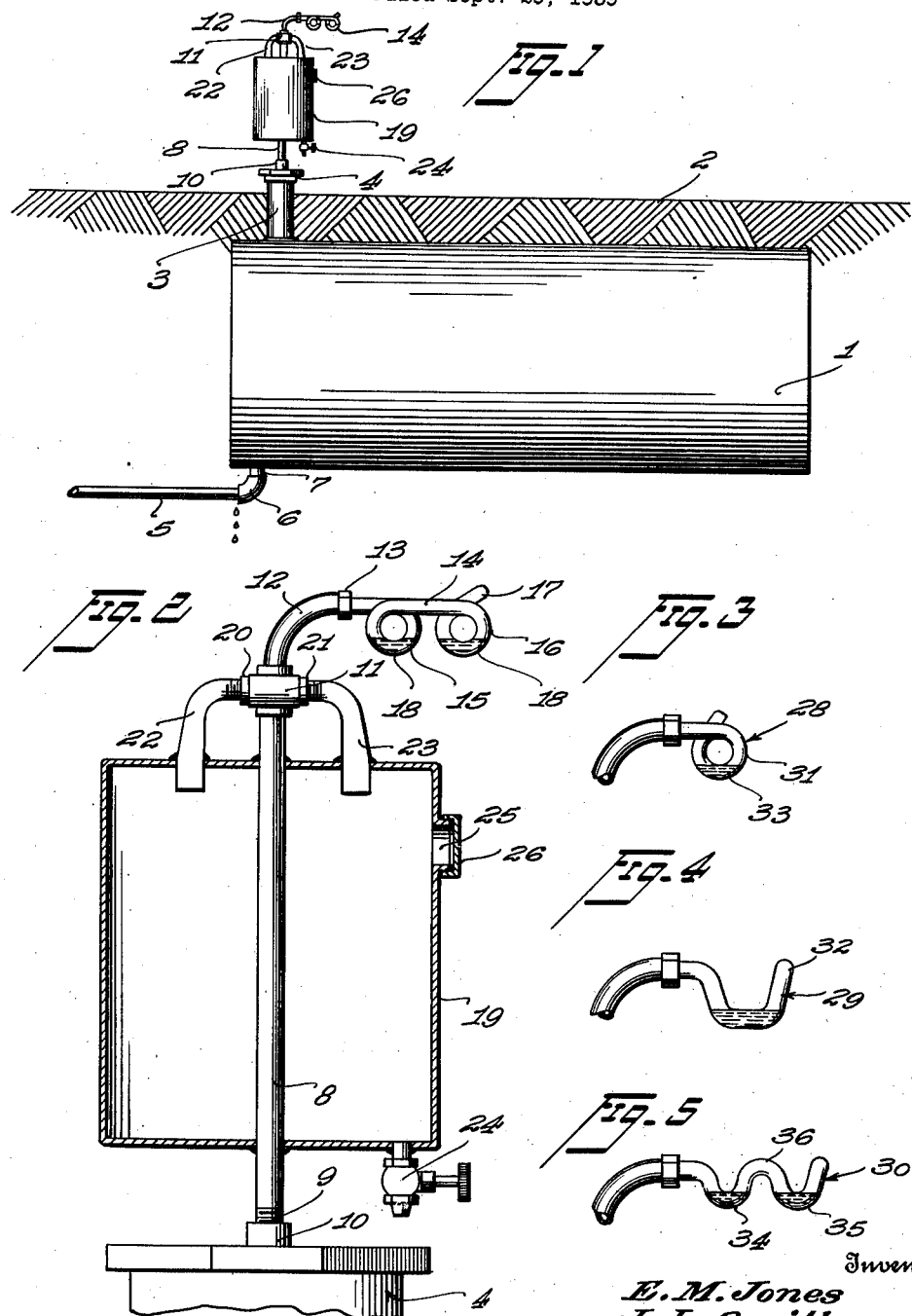

2,270,447

UNITED STATES PATENT OFFICE 2,270,447

TANK TESTING DEVICE

Ervin M. Jones, John L. Smith, and Stephen H. Trinneer, Aberdeen, Wash.

Application September 29, 1939, Serial No. 297,188

3 Claims. (Cl. 73—51)

This invention relates to an improved tank testing device and seeks, among other objects, to provide a device of this character which will be highly effective in use for detecting leaks in tanks, particularly those which are buried or otherwise concealed.

A further object of the invention is to provide a tank testing device which will be characterized by extreme simplicity and which will, nevertheless, be effective in use for detecting even the smallest leaks.

As a further object, the invention seeks to provide a device which will also be effective for indicating when liquid is being withdrawn from the tank or container in greater or less amounts.

Other and incidental objects of the invention not mentioned hereinbefore, will become apparent during the course of the following description.

Referring now to the drawing forming a part of our invention:

Figure 1 is a side elevation showing our improved tank testing device as it would appear installed on a tank located beneath the surface of the ground.

Figure 2 is an enlarged vertical sectional view of the tank testing device.

Figure 3 is a detail plan view showing a slightly modified form of indicator tube.

Figure 4 is a detail plan view showing a further modified form of indicator tube.

Figure 5 is a plan view of a still further embodiment of the invention.

Referring now more particularly to the accompanying drawing, wherein like numerals of reference will be seen to designate like parts throughout the various views, the numeral 1 indicates a tank of any approved construction which has been buried beneath the surface 2. The tank 1 includes a filler neck 3 having a cap 4 at its upper extremity. A distributing pipe 5, an elbow 6, and a connecting pipe 7 serve to lead fluid from the tank to a consuming device.

In carrying the invention into effect, we employ a pipe 8 which has a threaded lower end portion 9 screwed into a threaded boss 10 on the cap 4. It should be understood that the cap 4 may be embodied as part of our invention so that it will not be necessary to aperture tank caps for the purpose of testing tanks with our improved device. The pipe 8 extends vertically and has connected therewith a union 11. Connected with the upper discharge opening of the union is a curved mounting pipe 12 which is provided, at its upper end, with a connector 13.

The connector 13 serves to rigidly connect the mounting pipe 12 with a preferably transparent indicator tube 14 which extends laterally and is formed of glass or other suitable material. The indicator tube 14, as shown in Figures 1 and 2 of the drawing, is formed with a pair of loops 15 and 16 and an apertured end portion 17. Liquid 18, which may be of any desired nature, is carried at the bottom of each of the loops 15 and 16. The liquid is red in color, or of some other suitable color, so that its activity may be readily observed. As will be clearly seen in Figure 2, the amount of liquid in each of the loops 15 and 16 is such that air entering the apertured end 17 will be required to pass through the liquid before leaving the tube 14 and entering the connector 13.

Mounted on the pipe 8 and surrounding said pipe in axial relation thereto is a primer tank 19. The primer tank is connected to the side openings 20 and 21 of the union 11 by pipes 22 and 23. In order to permit drainage of the primer tank there is provided a drain cock 24. An opening 25 which is normally closed and sealed by a filler cap 26, permits entry of priming liquid to the interior of the primer tank.

The operation of the invention is as follows: The pipe 8 is screwed into the boss 10 of the tank to be tested or, as stated, the cap 4 and pipe 8 may be fastened together permanently, in which event the tank cap is removed and the cap 4 of the device screwed in place thereon. After this is done, it is necessary to create a vacuum within the body pipe and the upper part of the tank to be tested. This is accomplished by removing the cap 26 and introducing priming liquid to the primer tank through the opening 25. After liquid has been introduced into the tank, the cap 26 is screwed into place for providing a seal. The drain cock 24 is then opened for allowing the liquid within the tank to drain therefrom. As the liquid drains from the tank, air will be removed from the interior of the tank, the pipe 8, and the connector. The device is then ready for use. Should there be a leak in the tank 1, or in any of the distributing pipes connected therewith, suction created by the displacement of liquid caused by the leak, will affect the condition within the pipe 8, connector 12 and indicator pipe 14, so that, as the liquid passes from the tank 1, air will be drawn through the apertured end 17 of the indicator tube and through the liquid 18, the connector 13, pipe 8 and into the tank above the diminishing liquid. As liquid passes from the tank 1, as heretofore described, air passing into the tank will cause the liquid 18 to bubble within the loops 15 and 16. The bubbling of the liquid 18 will be clearly apparent to a service man or other person who is testing the tank.

Attention is directed to the fact that by the use of our improved tank testing device, buried or otherwise concealed tanks may be readily tested without removing them from their positions with attendant great expense. Our device will indicate leaks of a very minute nature, the slightest leak in the tank or pipe lines connected therewith being indicated by bubbling of the liquid 18. By the use of the primer pump 19, a vacuum may be built up at once so that tanks may be quickly tested, both for liquid leaks and air leaks. It should be understood that the violence with which the liquid 18 bubbles indicates the extent of the leak.

It will be apparent that the indicator tube 14 will be effective for showing when liquid is being drawn from the tank by a pump or the like.

Referring now to the modifications of the invention, as shown in Figures 3, 4 and 5 of the drawing, the numerals 28, 29 and 30 indicate slightly modified indicator tube constructions. The indicator tubes shown at 28 and 29 each employ but one loop 31 and 32. It has been found that in some installations an indicator tube with but one loop functions more efficiently than a tube having more than one loop. Liquid 33, similar to the liquid 18, is carried in the loops 28 and 29. The indicator tube shown in Figure 5, at 30, is somewhat similar to the indicator tube 14, in that two liquid bodies are employed. The liquid bodies are indicated at 34 and 35 and are separated by an arch 36 in the tube 30.

The operation of the modified forms is substantially identical with that of the indicator tube of the preferred form. However, as stated, it has been found that indicator tubes with but one loop are more effective in connection with some installations than those having more.

It is thought that further description of the invention is unnecessary.

Having thus described the invention, what is claimed is:

1. In a device of the class described, a pipe, means for connecting the pipe to a tank to be tested, a primer tank carried by the pipe in axial relation thereto, a union carried by the pipe and having discharge openings, pipes connecting certain of said discharge openings to the primer tank, a connector connected with certain other of the discharge openings of the union, and an indicator tube mounted on the connector and having a loop and an apertured end portion, said loop being partially filled with liquid, said primer tank being adapted to contain liquid to be drained therefrom for creating a vacuum within the pipe, union, connector and indicator tube so that air passing from the tank to be tested will draw air through the apertured end of the indicator tube and through the liquid, through the connector and through the pipe and into the tank to be tested for displacing air removed by the passage of liquid from the tank being tested, the air passing through the liquid in the indicator tube causing bubbling thereof and consequent indication of leakage.

2. In a device of the class described, a pipe, means for connecting the pipe to a tank, an hermetically sealed casing surrounding the pipe and connected thereto in air-tight relation for creating a vacuum chamber about a section of the pipe, a union joint interposed in air-tight relation between the sealed casing and an indicating means, and an indicator tube fitted on the union and having a loop partially filled with liquid, said indicator tube having an apertured end portion for permitting inflow of air, said air passing through the liquid and into the pipe to replace air displaced by passage of liquid from the tank being tested, the flow of air through the loop and liquid therein causing bubbling of the liquid and indication of a leak.

3. In a device of the class described as recited in claim 2 wherein the means for creating a vacuum in the pipe consists of a primer tank surrounding the pipe and pipes connecting the primer tank to said first-mentioned pipe.

ERVIN M. JONES.
JOHN L. SMITH.
STEPHEN H. TRINNEER.